United States Patent [19]

Finck et al.

[11] 4,431,267

[45] Feb. 14, 1984

[54] OPTICAL SYSTEM WHICH PROVIDES A COLLIMATED LIGHT BEAM

[75] Inventors: Johan C. J. Finck; Henricus M. M. Kessels, both of Eindhoven, Netherlands

[73] Assignee: U.S. Philips Corporation, New York, N.Y.

[21] Appl. No.: 315,690

[22] Filed: Oct. 28, 1981

[30] Foreign Application Priority Data

Nov. 6, 1980 [NL] Netherlands .......................... 8006061

[51] Int. Cl.³ .............................................. G02B 7/02
[52] U.S. Cl. .................................... 350/237; 350/245; 350/252
[58] Field of Search ........................ 350/237, 242–245, 350/251–253, 574, 255, 257, 429, 518, 564; 372/92, 101, 109; 353/101

[56] References Cited

U.S. PATENT DOCUMENTS

| | | | |
|---|---|---|---|
| 870,535 | 11/1907 | Bausch | 350/253 |
| 3,220,309 | 11/1965 | Wohler | 350/252 |
| 3,351,408 | 11/1967 | Krewalk | 350/252 |
| 3,763,543 | 10/1973 | Strauch et al. | 350/252 |
| 4,203,652 | 5/1980 | Hanada | 372/101 |

FOREIGN PATENT DOCUMENTS

| | | | |
|---|---|---|---|
| 2236261 | 6/1973 | Fed. Rep. of Germany | 350/252 |
| 2623389 | 12/1976 | Fed. Rep. of Germany | 372/109 |
| 430551 | 10/1911 | France | 350/257 |
| 587090 | 4/1947 | United Kingdom | 350/252 |

OTHER PUBLICATIONS

Habegger, M. A., "Mounting Unit for Laser Cavity", IBM Tech. Disc. Bull., 3-1968, pp. 1509-1510.

*Primary Examiner*—William H. Punter
*Attorney, Agent, or Firm*—Thomas A. Briody; Robert T. Mayer; Steven R. Biren

[57] ABSTRACT

An optical system which provides a collimated light beam, having a tubular holder, a semiconductor laser and a system of lenses incorporated in the holder, in which the semiconductor laser is positioned against an abutment in the axial direction of the holder and a resilient element is placed between the system of lenses and the abutment, while on the side of the system of lenses remote from the resilient element a locking element is present which, after axial adjustment in the holder, is fixed in such a location that the system of lenses, after moving in the axial direction against the pressure of the resilient element, is in the position in which its focus coincides with the laser element in the semiconductor laser.

6 Claims, 4 Drawing Figures

OPTICAL SYSTEM WHICH PROVIDES A COLLIMATED LIGHT BEAM

BACKGROUND OF THE INVENTION

The invention relates to an optical system which provides a collimated light beam, comprising a tubular holder, a semiconductor laser incorporated in the holder, and a system of lenses incorporated in the holder, the focus of which coincides with a laser element incorporated in the semiconductor laser.

An optical system of the above-mentioned kind is disclosed in U.S. Pat. No. 4,365,323, in particular FIG. 16. The semiconductor laser emits a strongly diverging beam of rays, in contrast with, for example, a HeNe laser. In order to obtain a parallel beam of rays when a semiconductor laser is used, the system of lenses must be positioned very accurately with respect to the semiconductor laser element, in which the focus of the system of lenses must be adjusted so as to be accurate within 1 µm with respect to the laser element. The U.S. Pat. No. 4,356,323 shows a general arrangement but does not give any indication of how to obtain an accurate adjustment and a suitable structural configuration for the optical system.

SUMMARY OF THE INVENTION

It is an object of the invention to provide an optical system of the kind mentioned above which comprises means which permit accurate adjustment in a comparatively simple manner and which system is also suitable for production. In order to achieve this object, an optical system according to the invention is characterized in that in the axial direction of the holder the semiconductor laser is positioned against an abutment, that a resilient element is provided between the system of lenses and the abutment, and that a locking element is present on the side of the system of lenses remote from the resilient element, which locking element, after axial adjustment in the holder, is fixed in such a location that the system of lenses, after moving in the axial direction against the pressure of the resilient element, is in the position in which its focus coincides with the laser element in the semiconductor laser.

The semiconductor laser is moved in the holder until it is positioned against the abutment and is fixed in that position, then the resilient element and the system of lenses and the locking element are inserted in the holder. This assembly is then placed in an aligning apparatus, the locking element with the system of lenses is moved in the direction of the laser against spring action and when it is established in the aligning apparatus that the optical system provides a collimated light beam, so that the emanating rays extend parallel, the locking element is fixed in the holder, so that the system of lenses is simultaneously and accurately adjusted.

Such an optical system can be easily manufactured and has wide application possibilities. For example, it is suitable for use in video disc players, in digital optical recording, in optical displacement transducers based on the interferometric principle, and for many other applications.

In a preferred embodiment of the optical system in accordance with the invention, the tubular holder comprises on its inner surface at least three ribs, the tops of which are situated accurately on the surface of a circular cylinder for accurate radial adjustment of at least the system of lenses. Herewith it is achieved that the system of lenses and possible other components of the optical system are additionally adjusted very accurately in the holder in a radial direction.

In a further embodiment of the optical system in which a cylinder lens is also present which is situated on the side of the system of lenses remote from the semiconductor laser, according to the invention a metal locking element having lugs is provided, the lugs engaging about circumferential parts of the cylinder lens in such manner that upon rotating the locking element the cylinder lens is adjustable tangentially.

By using a cylinder lens the astigmatism of the laser can be corrected. By rotating the cylinder lens into the correct position, the oval beam of rays changes into a circular beam. The locking element with the lugs is a handy means to adjust the cylinder lens.

The locking element can be fixed with respect to the holder in various manners. It has proved to be particularly favorable to construct the locking element as a metal ring and the holder as a metal tube, the holder, at the location where the locking element is present, comprising at least three blind holes of which the part of material still present is melted by means of heating by a laser pulse and after solidification forms a joint between the holder and the locking element. As a result of this a rigid permanent fixation is obtained, with the position being adjustable very accurately.

After adjusting the locking element, the system of lenses and the semiconductor laser can be spaced extremely accurately by means of the pressure which is exerted by the resilient element. It may be advantageous to set this position permanently and not to let it be dependent on the spring pressure and not to let it be influenced by external forces. For this purpose, according to an embodiment of the invention, an annular metal element may be provided between the system of lenses and the semiconductor laser, the holder in the location where the annular element is present comprising at least three blind holes in which part of the material still present is melted by means of heating by a laser pulse and after solidification forms a joint between the holder and the annular metal element.

Although the holder, the locking element and the annular element may be formed from any material, these parts preferably consist of a metal, such as aluminum. It is then ensured that the optical system, once adjusted, will accurately remain in position, that no mutual stresses occur in the case of temperature variations, and that the material has sufficient rigidity to prevent variation of the mutual position.

BRIEF DESCRIPTION OF THE DRAWING

The invention will be described in greater detail with reference to the drawing in which.

DESCRIPTION OF THE PREFERRED EMBODIMENTS

Figure 1:
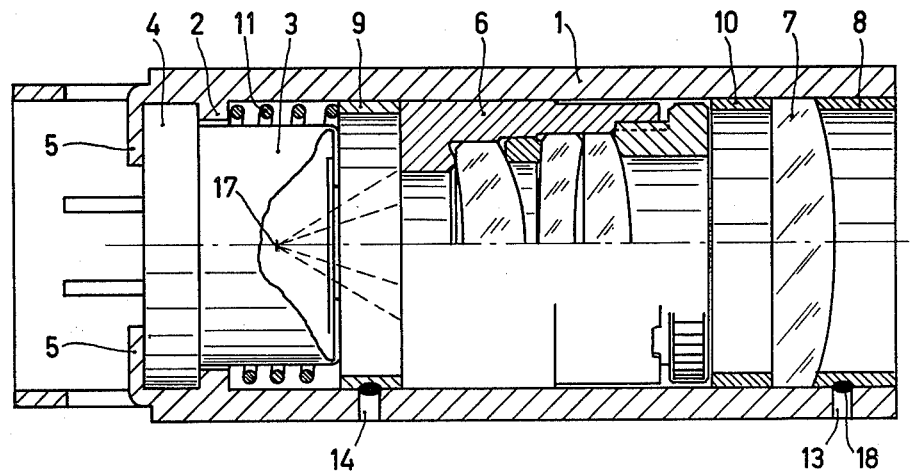
FIG. 1 shows a first embodiment of the optical system to obtain a collimated beam.

FIG. 1 shows a first embodiment of an optical system which provides a collimated light beam. A holder 1, preferably of aluminum, has an abutment 2. A semiconductor laser 3 comprises a flange 4; said flange engages with its upper surface the abutment 2 and with its side face the inner wall of holder 1. The semiconductor laser 3 is fixed in the holder by means of bent-over lugs 5 which are formed from material of an end portion of the holder.

The holder furthermore comprises a system of lenses 6, as well as a cylinder lens 7. A locking element 8 is provided at the laser-remote end of the holder, while an annular element 9 is present between the laser and the system of lenses and a second annular element 10 is present between the system of lenses 6 and the cylinder lens. Furthermore, a resilient element in the form of a helical compression spring 11 is present between the abutment 2 and the annular element 9.

Figure 2:
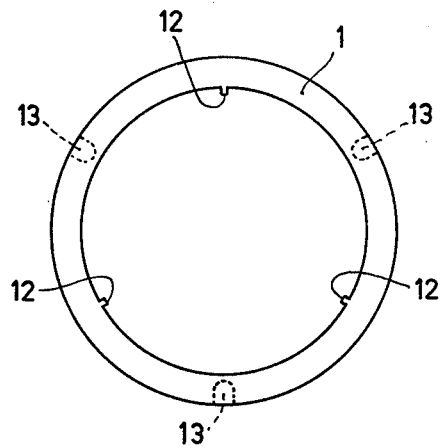
FIG. 2 is a side elevation of the holder.
Figure 3:
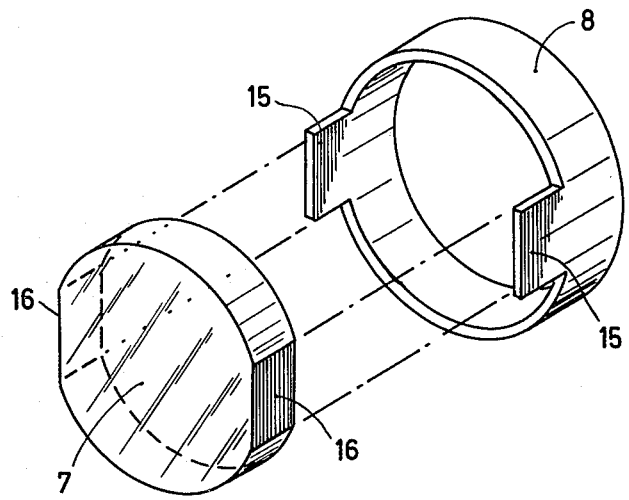
FIG. 3 shows a cylinder lens and an associated locking element.

The inner surface of the holder 1 preferably comprises three ribs 12, as shown in FIG. 2. The tops of the ribs are provided accurately on the surface of a circular cylinder by means of a calibrating tool. The lenses 6 and 7 can thus be adjusted radially very accurately. At the area of the ring, furthermore three blind holes 13 are provided in the holder (see also FIG. 2), while at the area of the ring 9 three further blind holes 14 are present in the holder. The annular element 8 comprises two lugs 15 which engage around flattened sides 16 of cylinder lens 7, see FIG. 3.

In order to obtain an emanating light beam having parallel rays, the focus of the system of lenses 6 must coincide very accurately with the light-emitting laser element 17 of the p-n laser 3. For this purpose, after providing the indicated components in the holder 1, the locking ring 8 is moved in the direction of the semiconductor laser 3. During this movement, ring 10, system of lenses 6 and ring 9 also move so that spring 11 is compressed. When it is established on an aligning apparatus that the emanating beam of rays is parallel, the locking element 8 is fixed. Although there exist several possibilities for this purpose, the fixation is preferably obtained by heating the material in the blind holes 13 by means of a laser pulse. Only a very local heating is obtained in which some material melts both from the holder and from the ring 8, and after solidification a permanent position of the ring 8 is obtained. The resulting joint is referenced 18. In this position the system of lenses 6 is very accurately adjusted; the accuracy of adjustment of the focus relative to the laser element 17 is better than 1 μm.

In order not to be permanently dependent on the quality of spring 11 to extremely accurately maintain the distance between laser element 17 and lens 6 when the optical system described is used, ring 9 may also be connected permanently to holder 1. In this case also, the joint via melting of material in hole 14 by means of heating with a laser pulse is to be preferred.

The holder and the rings 8, 9 and 10 are preferably manufactured from aluminum.

The cylinder lens 7 serves to correct for the astigmatism of the laser. Rotating the lens 7 causes the emanating beam of rays to change from an oval shape into a circular shape. Rotating the cylindrical lens is carried out by rotating locking element 8; the lugs 15 engaging about the flattened sides 16 cause a simultaneous rotation of the cylinder lens. The connection of the locking element 8 to the holder takes place after adjusting the system of lenses 6 and the cylinder lens 7.

Figure 4:
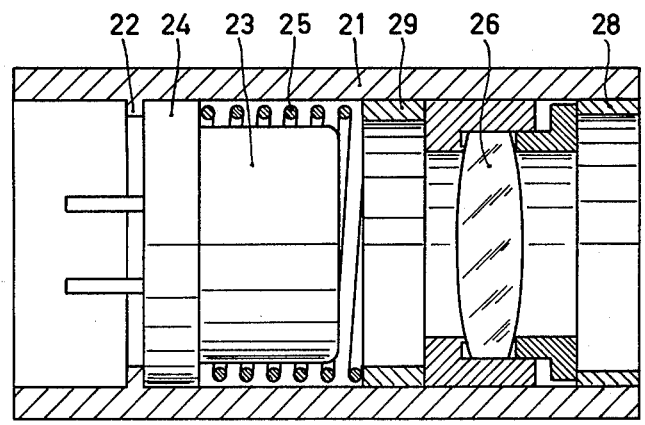
FIG. 4 shows a second embodiment of the optical system.

FIG. 4 shows a simplified construction of an optical system to obtain a collimated light beam.

A semiconductor laser 23 is placed in a holder 21 having an abutment 22. A spring 25 is present between a flange 24 of the semiconductor laser and a ring 29. A lens 26 and a locking ring 28 complete the optical system. The lens 26 is preferably a known bi-aspherical lens. It can be manufactured, for example, from synthetic resin.

In this case also, lens 26 is moved relative to the laser device against the pressure of spring 25 by means of the adjustment of locking ring 28. When the focus of the lens has been adjusted accurately with respect to the laser element (not shown), locking ring 28 is connected, preferably again by heating by means of a laser pulse, as described with reference to FIG. 1. If desired, ring 29 may also be fixed in this manner. The device shown in FIG. 4 may be used in situations where the correction for astigmatism of the semiconductor laser is not necessary.

What is claimed is:

1. An optical system which provides a collimated light beam, comprising a tubular holder, a semiconductor laser and a system of lenses in the holder, the focus of said system of lenses being adjustable to coincide with a laser element incorporated in the semiconductor laser, characterized in that in the axial direction of the holder the semiconductor laser is positioned against an abutment, that a resilient element and an annular element are provided between the system of lenses and the abutment, said resilient element being located between said annular element and said abutment, and that on the side of the system of lenses remote from the resilient element a locking element is provided, after the axial focusing adjustment in the holder, said locking element and said annular element being secured to said holder such that the system of lenses, after moving in the axial direction in said holder against the pressure of the resilient element, is fixedly located in the position at which its focus coincides with the laser element in the semiconductor laser.

2. An optical system as claimed in claim 1, characterized in that on its inner surface the tubular holder has at least three ribs, the tops of which are precisely located for the accurate radial adjustment of at least the system of lenses.

3. An optical system as claimed in claim 1 or 2, further comprising a cylinder lens which is provided on the side of the system of lenses remote from the semiconductor laser, characterized in that said locking element comprises a metal locking element having lugs, the lugs engaging around circumferential parts of the cylinder lens such that upon rotating the locking element the cylinder lens is also rotated.

4. An optical system as claimed in claim 1 or 2, characterized in that the locking element comprises a metal ring and the holder comprises a metal tube, the holder comprising at least three blind holes at the location of the locking element, the part of material still present in said blind holes being melted by means of heating by a laser pulse and after solidification forming a joint between the holder and the locking element.

5. An optical system as claimed in claim 1 or 2, characterized in that said annular element comprises an annular metal element, the holder having at least three blind holes at the location of the annular element, the part of material still present in said holes being melted by means of heating by a laser pulse and after solidification forming a joint between the holder and the annular metal element.

6. A device as claimed in claim 5, characterized in that the holder, the locking element and the annular metal element are made of aluminum.

* * * * *